UNITED STATES PATENT OFFICE.

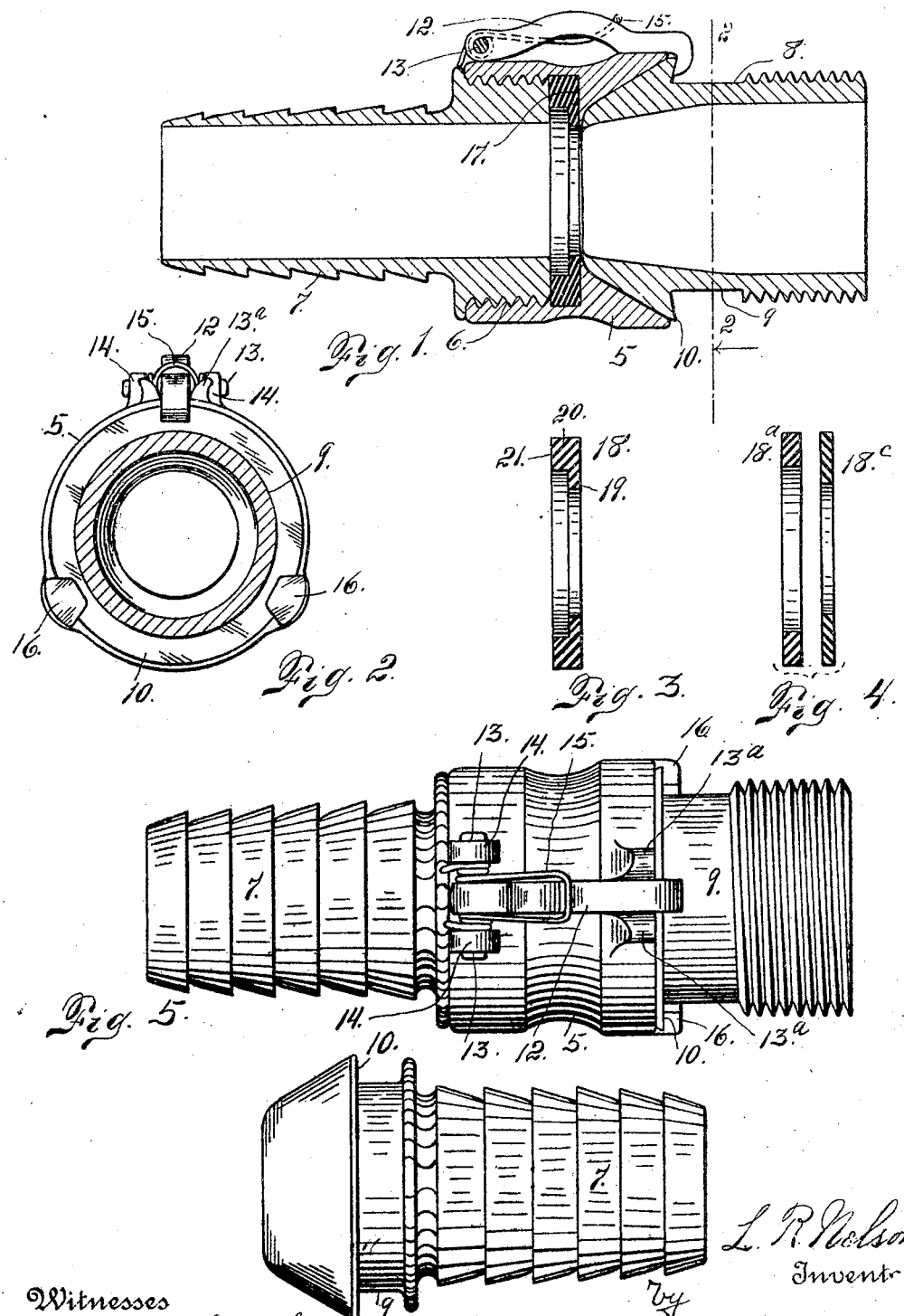

LEWEN R. NELSON, OF BOULDER, COLORADO.

HOSE-COUPLING.

No. 798,441.   Specification of Letters Patent.   Patented Aug. 29, 1905.

Application filed November 25, 1904. Serial No. 234,121.

*To all whom it may concern:*

Be it known that I, LEWEN R. NELSON, a citizen of the United States, residing at Boulder, in the county of Boulder and State of Colorado, have invented certain new and useful Improvements in Hose-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in hose-coupling, my object being to provide means for quickly connecting and disconnecting one section of a hose or other conduit with another section of hose or conduit or one section of hose with a hydrant equipped with a suitable member for the purpose.

An important feature of my improved device consists of a washer which projects interiorly farther on one surface than the other. In other words, the washer is not of uniform width or thickness, its outer portion being thickest, while its inner portion is comparatively thin. The object of this construction is to allow the water to act on the interior part of the washer, even when one of the metal parts of the conduit is thicker than the width of the body of the washer. If the washer were of uniform width and the adjacent metal part of the conduit were of equal width, there would be no opportunity for the water flowing through the conduit to act on the washer and by its pressure make the joint water-tight. My improved construction, however, overcomes this difficulty, as will be readily understood.

The invention will now be described in detail, reference being made to the accompanying drawings, in which—

Figure 1 is a section illustrating my improved coupling. Fig. 2 is a section taken on the line 2 2, Fig. 1, viewed in the direction of the arrow. Fig. 3 is a section of one form of the washer. Fig. 4 is a similar view showing the washer in two parts. Fig. 5 is an elevation of the construction shown in Fig. 1. Fig. 6 is an elevation of one form of metal member employed with my improved construction.

The same reference characters indicate the same parts in all the views.

Let the numeral 5 designate a coupling-sleeve, a portion of which is interiorly threaded, as shown at 6, to receive one extremity of an exteriorly-threaded hose-coupling member 7. The opposite extremity of this coupling is recessed to receive the cone-shaped extremity of a member 8, which is provided with a circumferential groove 9, whereby a shoulder 10 is formed, adapted to receive the hook-shaped extremity of a spring-actuated locking-dog 12. This locking-dog is connected with the sleeve 5 by a pin 13, which passes through registering openings formed in the dog, and two lugs 14, formed on the sleeve. The dog is located between the two lugs and is normally thrown to the locking position by a spring 15, whose double portion engages the dog exteriorly and whose extremities are coiled around the pin 13 on opposite sides of the lug, the spring being given enough turns to give it the desired tension. The sleeve is also provided with two locking-lugs 16, which, as shown in the drawings, are formed integral with the body of the sleeve and overlap the cone-shaped recess. In order to connect the sleeve with the member 8, it is only necessary to place the cone-shaped head of the member 8 in such position that the two lugs 16 engage its shoulder 10. Then by pressing the cone-shaped head inwardly into the recess of the sleeve the hook-shaped extremity of the dog will be forced outwardly until the head of the part 8 enters the recess of the sleeve, when the locking extremity of the dog will slip into position behind the head 10, whereby the parts are securely locked in place. Just beyond the cone-shaped recess of the sleeve the latter is provided with a shoulder 17, against which rests a washer 18, having an interiorly-projecting part 19, which is of less thickness than the body of the washer 20. When the member 7 is screwed into position in the coupling, its inner extremity engages the adjacent face 21 of the narrow portion of the washer, but does not engage and cannot engage the interiorly-projecting part 19, thus leaving the part 19 of the washer free to be acted on by the water flowing through the coupling even when the portion of the part 7 which engages the washer is thicker than the width of its body portion, as shown in Fig. 1 of the drawings. By virtue of this arrangement the pressure of the water makes a tight joint at all times regardless of the thickness of the coupling member 7. Attention is called to the fact that the threaded portion 6 of the sleeve 5 is adapted for use with members 7 of all kinds as long as the exteriorly-threaded portions of the said members are of standard size. It often happens, however, that the material of these members is of different thickness. Hence if my packing-washer 18 were made of uniform thickness and of sufficient width to project inwardly beyond the adjacent extremity of one coupling member 7 another coupling member 7 might be of a thickness equal to or greater than the entire width of the washer, thus preventing the action of the water on the washer to make a tight joint.

The sleeve 5 is provided at its extremity remote from the lugs 13 with two guide-lugs 13ª, the space between the lugs at the top being somewhat wider than the width of the dog in order to accurately guide the latter into place.

Instead of forming the washer 18 integral, as shown in Fig. 3 of the drawings, it may be formed in two parts, as shown in Fig. 4, the said parts being designated 18ª and 18ᶜ. It is evident that these two washer members taken together will perform precisely the same function as the integral washer, and in the claims where the element "washer" is used the term must be understood of sufficient scope to cover both forms—that is to say, the integral form or the two-member form.

Having thus described my invention, what I claim is—

1. In a hose-coupling, the combination of a coupling-sleeve having an interiorly-threaded portion, and an interior shoulder adjacent the inner extremity of the threaded portion, a packing-washer engaging said shoulder and being wider on the shoulder-engaging surface than upon its opposite surface the wider portion of the washer having a relatively thin part projecting inwardly beyond the inner periphery of the thicker and narrower part, whereby the said thinner part is adapted to be acted on by the water flowing through the coupling.

2. The combination of a coupling-sleeve having an interiorly-threaded part, an unthreaded recessed part and an intermediate shouldered part, and a washer engaging the shoulder of the shouldered part and having its surface in direct contact with the shoulder, wider than its opposite surface its wider portion projecting inwardly beyond the narrower portion, the interiorly-projecting part being relatively thin and extending into the waterway for the purpose set forth.

3. The combination of a coupling-sleeve having an interiorly-threaded part at one end, and a conical chamber at the other end, a cone-shaped head adapted to fit said chamber and having an exterior shoulder, the sleeve having a locking-lug rigid therewith and adapted to engage the exterior shoulder of the head, and a spring-actuated dog mounted on the sleeve and also adapted to engage the same shoulder, the lug and the dog coöperating to lock the parts together.

4. In a hose-coupling, the combination of a sleeve having a threaded portion, an unthreaded recessed portion and an intermediate shouldered portion, two male members engaging respectively the threaded and unthreaded parts of the sleeve, a washer engaging the shoulder of the shouldered portion and having its shoulder-engaging surface wider than the opposite surface, the wider portion of the washer having a relatively thin part on its inner periphery adapted to be acted on by the water passing through the hose, the last-named surface of the washer being engaged by the threaded male member, leaving a space between said male member and the wider portion of the washer, the unthreaded male member having an exterior shoulder, the sleeve having locking parts engaging the shoulder of the unthreaded male member.

5. The combination of a coupling-sleeve having its opposite extremities respectively fashioned to receive two metal members, one of which is provided with an exterior shoulder the said sleeve having rigid lugs adapted to engage said shoulder, and a spring-actuated dog mounted on the coupling-sleeve, the latter being provided with guide-lugs for the dog, said lugs being located at the extremity of the sleeve remote from the pivoted end of the dog, the locking extremity of the dog being adapted to engage the said shouldered member, the said rigid lugs of the sleeve and the locking-dog coöperating to hold the parts in the assembled relation, substantially as described.

6. The combination of a coupling-sleeve, having a pair of apertured lugs at one extremity, a dog provided with an opening registering with the openings in the lugs of the sleeve, a pin passed through the registering openings of the lugs and dog, and an integral spring having a double portion engaging the dog at a suitable distance from the pin, the extremities of the spring being coiled around the pin, to give the spring sufficient tension to normally hold the dog in the locking position, the sleeve being provided with guide-lugs for the dog, located at the extremity of the sleeve remote from the apertured lugs.

7. The combination of a coupling-sleeve and a male member adapted to enter one extremity of the sleeve and provided with an exterior shoulder, the sleeve having a rigid lug adapted to engage said shoulder, and a spring-actuated dog mounted on the sleeve and having a hook-shaped extremity also adapted to engage the shoulder of the shouldered member, the dog and rigid lug of the sleeve coöperating to hold the parts in the assembled relation, substantially as described.

In testimony whereof I affix my signature in presence of two witnesses.

LEWEN R. NELSON.

Witnesses:
CARL G. STROOK,
P. M. NELSON.